(12) United States Patent
Hu et al.

(10) Patent No.: US 9,420,651 B2
(45) Date of Patent: Aug. 16, 2016

(54) LIGHT-EMITTING DIODE MODULE AND METHOD FOR OPERATING THE SAME

(75) Inventors: Yu-Chou Hu, Taoyuang (TW); Hsi-Yan Chou, Taoyuang (TW)

(73) Assignee: INTERLIGHT OPTOTECH CORPORATION, Yangmei, Taoyuan County (TW)

( * ) Notice: Subject to any disclaimer, the term of this patent is extended or adjusted under 35 U.S.C. 154(b) by 415 days.

(21) Appl. No.: 13/281,409

(22) Filed: Oct. 25, 2011

(65) Prior Publication Data

US 2013/0002155 A1  Jan. 3, 2013

(30) Foreign Application Priority Data

Jun. 30, 2011 (TW) .............................. 100123108 A

(51) Int. Cl.
  *H05B 37/02* (2006.01)
  *H05B 33/08* (2006.01)
(52) U.S. Cl.
  CPC .......... *H05B 33/0824* (2013.01); *H05B 33/083* (2013.01); *H05B 33/0809* (2013.01); *Y02B 20/348* (2013.01)
(58) Field of Classification Search
  CPC ..................................................... H05B 33/083
  USPC ...................................................... 315/185 R
  See application file for complete search history.

(56) References Cited

U.S. PATENT DOCUMENTS

| 7,081,722 | B1 * | 7/2006 | Huynh et al. ............. 315/323 |
| 7,701,149 | B2 * | 4/2010 | Lin .............................. 315/307 |
| 2004/0233145 | A1 * | 11/2004 | Chiang ............................ 345/82 |
| 2005/0286271 | A1 * | 12/2005 | Vinciarelli .................... 363/17 |
| 2006/0038803 | A1 * | 2/2006 | Miller et al. ................ 345/204 |
| 2006/0082331 | A1 * | 4/2006 | Ashdown .................... 315/291 |
| 2006/0175985 | A1 * | 8/2006 | Huynh et al. ............... 315/312 |
| 2006/0208669 | A1 * | 9/2006 | Huynh et al. ............... 315/312 |
| 2007/0046485 | A1 * | 3/2007 | Grootes et al. .......... 340/815.45 |
| 2008/0001547 | A1 * | 1/2008 | Negru .......................... 315/189 |
| 2008/0068298 | A1 * | 3/2008 | Shen et al. ..................... 345/46 |

(Continued)

FOREIGN PATENT DOCUMENTS

EP  2 299 783 A2  3/2011
EP  2 385 748 A1  11/2011

(Continued)

OTHER PUBLICATIONS

McGraw-Hill, 'Dictionary of Scientific and Technical Terms', Sixth Edition, 2003.*

(Continued)

*Primary Examiner* — Daniel D Chang
(74) *Attorney, Agent, or Firm* — Muncy, Geissler, Olds & Lowe, P.C.

(57) ABSTRACT

A light-emitting diode (LED) module and a method for operating the same are disclosed. The LED module is supplied through an external voltage source. The LED module includes a bridge rectifying unit, a LED unit, and an integrated circuit (IC) unit. The bridge rectifying unit rectifies the external voltage source into an inner DC voltage source. The LED unit is electrically connected to the bridge rectifying unit and driven through the DC voltage source. The IC unit is electrically connected to the bridge rectifying unit and the LED unit and is supplied through the DC voltage source, thus providing a piecewise constant-current control or a piecewise variant-current control to the LED unit.

9 Claims, 7 Drawing Sheets

(56) References Cited

U.S. PATENT DOCUMENTS

| | | | | |
|---|---|---|---|---|
| 2008/0303452 A1* | 12/2008 | Van Erp | ................ | 315/294 |
| 2010/0194298 A1* | 8/2010 | Kuwabara | ................ | 315/186 |
| 2010/0308739 A1 | 12/2010 | Shteynberg et al. | | |
| 2011/0025216 A1 | 2/2011 | Ching-Chi et al. | | |

FOREIGN PATENT DOCUMENTS

| | | |
|---|---|---|
| JP | 2010062515 A | 3/2010 |
| JP | 2010272838 A | 12/2010 |
| KR | 10-2011-0007706 A | 1/2011 |
| TW | 201114326 A | 4/2011 |
| WO | WO 2007/001116 A1 | 1/2007 |
| WO | WO2009019945 A1 | 2/2009 |
| WO | WO 2011/070482 A2 | 6/2011 |

OTHER PUBLICATIONS

Cypress Semiconductor, 'PowerPSoC in a 5V Input Supply System' AN54390, Jul. 7, 2009.*

Cypress Semiconductor 'PowerPSoC Intelligent LED Driver', Sep. 17, 2009.*

European Search Report for European Application No. 11 18 7047 dated Feb. 26, 2013.

Japan Official Action issued Mar. 5, 2013.

* cited by examiner

LIGHT-EMITTING DIODE MODULE AND METHOD FOR OPERATING THE SAME

BACKGROUND THE DISCLOSURE

1. Field of the Disclosure

The disclosure relates generally to a light-emitting diode and a method for operating the same, and more particularly to a light-emitting diode module and a method for operating the same.

2. Description of Prior Art

AC-driven LED lighting technology, also called AC LED lighting technology, prevails in recent years. Besides compatibility with conventional lighting apparatuses, the heat-dissipation problem produced in the DC LED lighting technology can be significantly reduced, thus saving energy, reducing carbon emissions, and increasing whole luminous areas.

The circuit for driving the AC LEDs has two categories: one is an inverse-parallel topology (as shown in FIG. 1A) and the other is a bridge-rectifying topology (as shown in FIG. 1B). For the inverse-parallel topology, the LEDs are bi-directional micro-diode structures. The LED micro diodes are etched on a substrate and then split and insulated. Afterward, each two micro diodes are inversely connected in parallel by a metal bridge and then the inverse-parallel micro diodes are connected in series to form N-set AC driven light-emitting diodes. Hence, the amount of the required micro diodes is 2×N. However, only half of the micro diodes simultaneously illuminate when all of the micro diodes are driven by the AC driven voltage. Accordingly, the main disadvantage of the inverse-parallel AC driven LEDs is that instantaneous luminous areas and availability are not high.

For the bridge-rectifying topology, the micro diodes are connected in a bridge structure. Also, an appropriate amount of the LEDs is driven by the AC voltage according to the required voltage, current, and input power. Although the bridge-rectifying topology can increase instantaneous luminous areas, the availability of the micro diodes is not ideal. That is because the micro diodes on a common bridge leg can illuminate during both the positive-half cycle and the negative-half cycle but the micro diodes on other four bridge legs only illuminate during the corresponding half cycle.

Reference is made to FIG. 2A which is a circuit diagram of a prior art AC driven light-emitting diodes having a bridge rectifier and FIG. 2B is a schematic waveform outputted from a circuit structure in FIG. 2A. As shown in FIG. 2A, the micro light-emitting diodes are supplied through an external AC voltage source Vac. The external AC voltage source Vac is rectified into a DC voltage source (not labeled) by a bridge rectifying unit (not labeled). The micro light-emitting diodes are driven by the DC voltage source and controlled through a constant-current scheme. The micro light-emitting diodes can be lightened when a magnitude of the driven voltage is greater than that of a total forward voltage of the light-emitting diodes because the light-emitting diodes are electrically connected in series. As shown in FIG. 2B, the driven voltage increases with the increasing external AC voltage source Vac when the driven voltage is greater than the total forward voltage, namely a turned-on angle θon is met. In this condition, the light-emitting diodes continually illuminate and a constant-current Ic flows through the light-emitting diodes. On the other hand, the light-emitting diodes are off when the driven voltage is less than the total forward voltage. In a half cycle, a lighting time interval θe is a period that the light-emitting diodes are illuminated, which is shown between the turned-on angle θon and the turned-off angle θoff. Accordingly, the main disadvantage of the bridge-rectifying AC driven LEDs is that luminous efficiency is too low.

Accordingly, it is desirable to provide a light-emitting diode module and a method for operating the same. A piecewise current control (including a piecewise constant-current control and a piecewise variant-current control) is provided to improve luminous efficiency and increase availability of the light-emitting diodes. In addition, a system in package (SIP) topology is provided to simplify the package process and minify the light-emitting diodes.

SUMMARY THE DISCLOSURE

The disclosure provides a light-emitting diode module. The light-emitting diode module includes a light-emitting diode unit and an integrated circuit unit. A voltage source is supplied to the light-emitting diode module.

The light-emitting diode unit is electrically connected to the voltage source and driven by the voltage source. The light-emitting diode unit has a plurality of light-emitting diode strings and the light-emitting diode strings are electrically connected in series. The integrated circuit unit is electrically connected to the voltage source and the light-emitting diode unit, and the integrated circuit is supplied through the voltage source. The integrated circuit unit has at least one constant-current source, at least one switch element, and a controller. The controller is electrically connected to the at least one constant-current source and the at least one switch element to control the at least one switch element by judging a magnitude of the voltage source, thus providing a piecewise constant-current control or a piecewise variant-current control to the light-emitting diode unit.

In another embodiment, the disclosure provides a method for operating a light-emitting diode module to solve the above-mentioned problems. The light-emitting diode module is supplied through a voltage source. The method for operating the light-emitting diode module includes the following steps: A light-emitting diode unit is provided, and the light-emitting diode unit has a plurality of light-emitting diode strings and the light-emitting diode strings are electrically connected in series. An integrated circuit unit is provided, and the integrated circuit unit has at least one constant-current source, at least one switch element, and a controller to provide a piecewise current control to the light-emitting diode unit by judging a magnitude of the voltage source.

It is to be understood that both the foregoing general description and the following detailed description are exemplary, and are intended to provide further explanation of the disclosure as claimed. Other advantages and features of the disclosure will be apparent from the following description, drawings and claims.

BRIEF DESCRIPTION OF DRAWING

The features of the disclosure believed to be novel are set forth with particularity in the appended claims. The disclosure itself, however, may be best understood by reference to the following detailed description of the disclosure, which describes an exemplary embodiment of the disclosure, taken in conjunction with the accompanying drawings, in which:

DETAILED DESCRIPTION

Figure 1A:
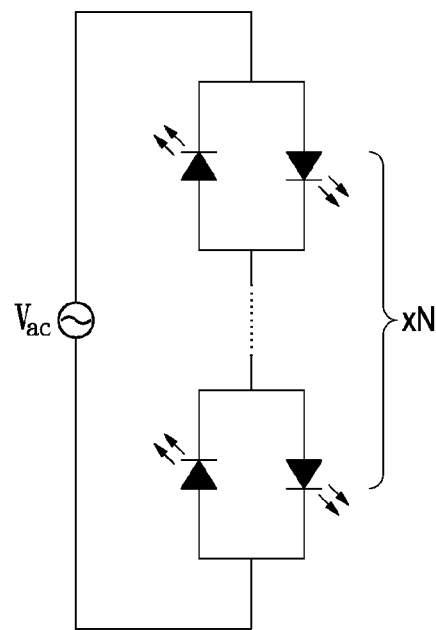
FIG. 1A is a circuit diagram of a prior art AC driven light-emitting diodes with an inverse-parallel arrangement.
Figure 1B:
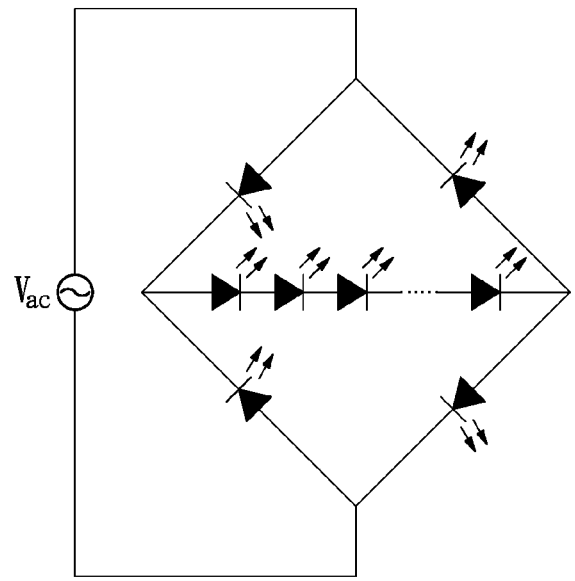
FIG. 1B is a circuit diagram of a prior art AC driven light-emitting diodes with a bridge-rectifying arrangement.
Figure 2A:
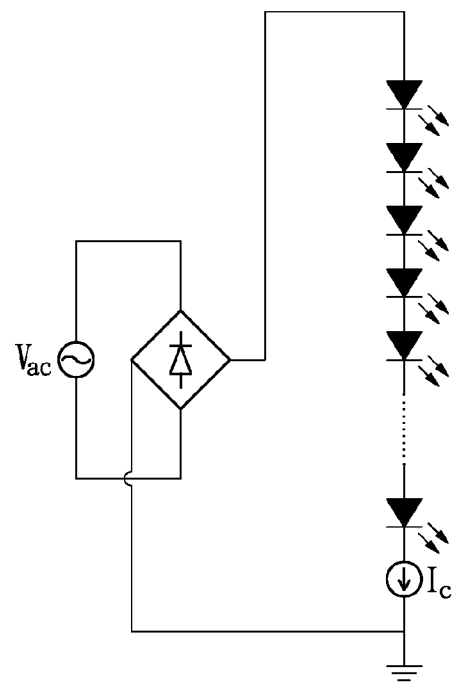
FIG. 2A is a circuit diagram of a prior art AC driven light-emitting diodes having a bridge rectifier.
Figure 2B:
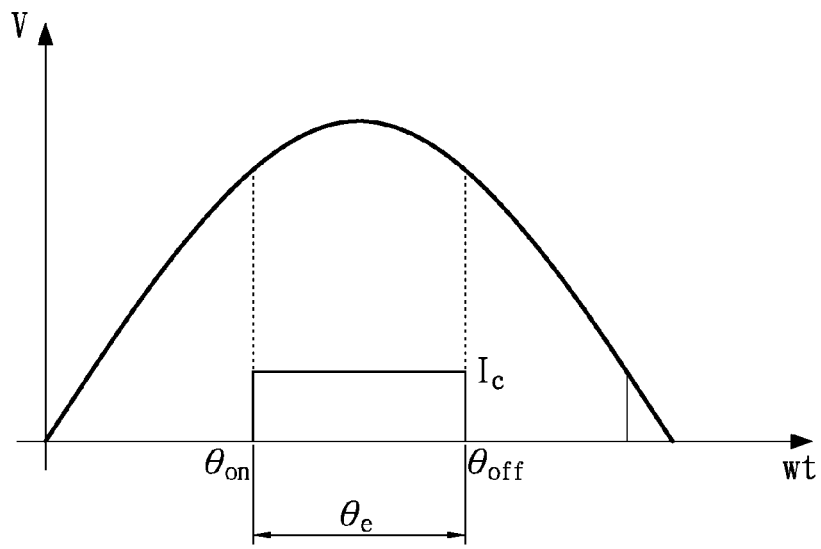
FIG. 2B is a schematic waveform outputted from a circuit structure in FIG. 2A.

Reference will now be made to the drawing figures to describe the disclosure in detail.

Figure 3A:
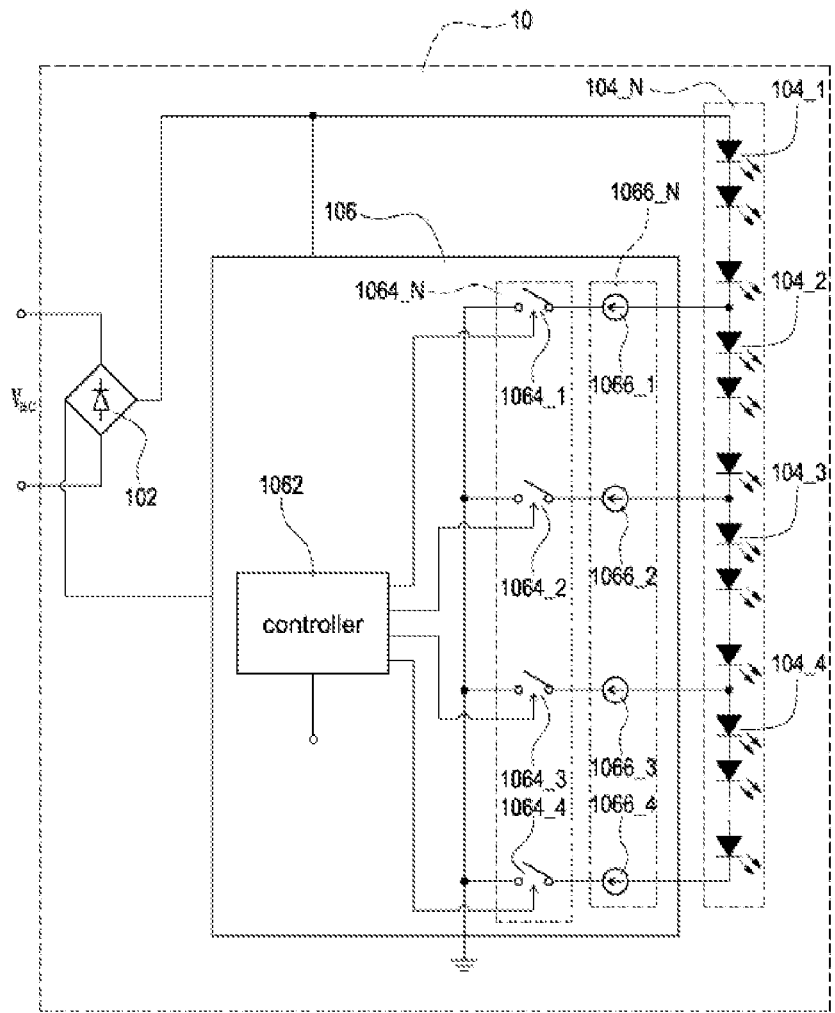
FIGS. 3A and 3B are circuit diagrams of an AC driven light-emitting diode module with a piecewise current control according to the prevent invention.
Figure 3B:
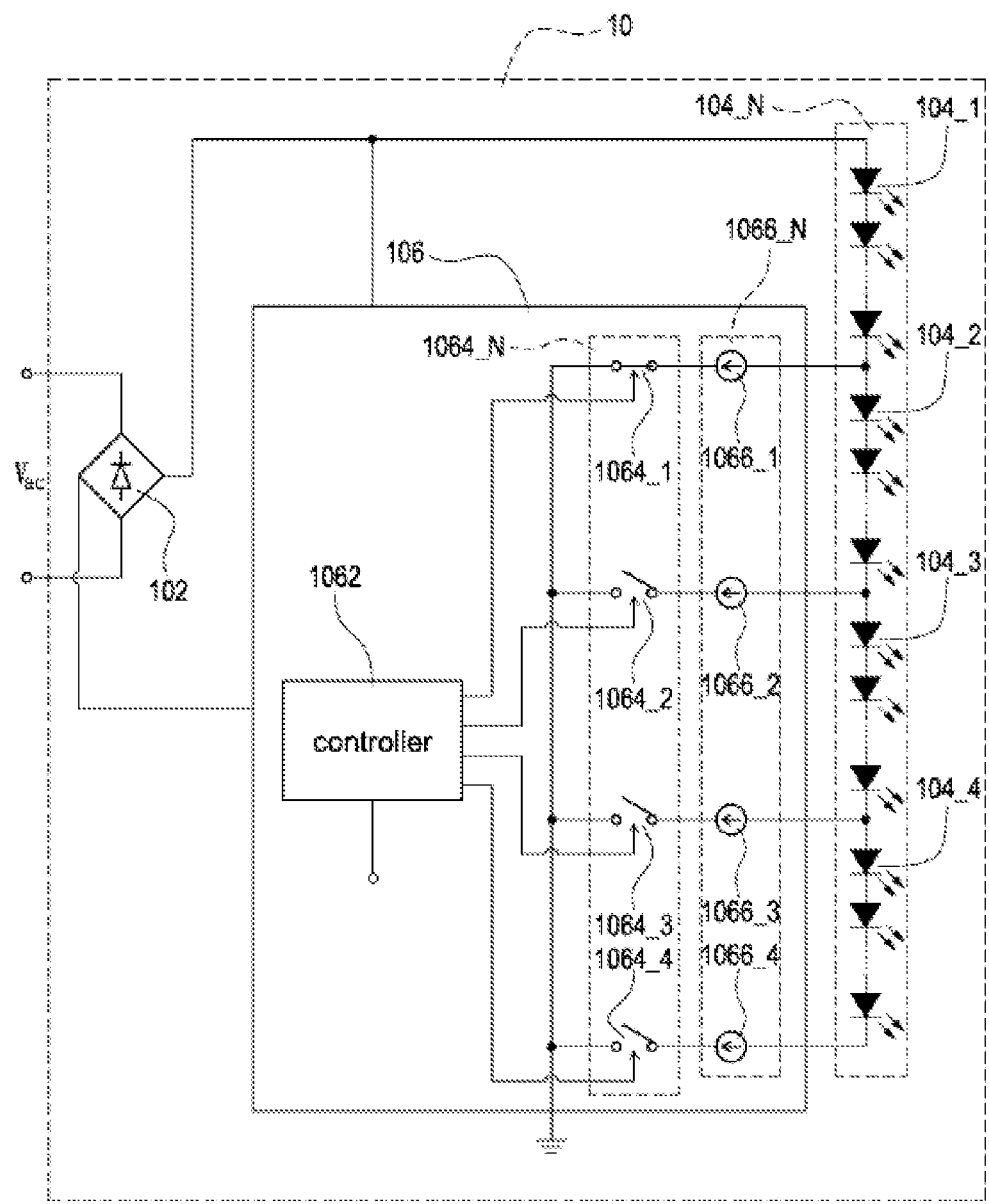

Reference is made to FIG. 3 which is a circuit diagram of an AC driven light-emitting diode module with a piecewise current control according to the prevent invention. The light-emitting diode module 10 is supplied through an external AC voltage source Vac or a DC voltage source. In this embodiment, the AC voltage source Vac supplies the light-emitting diode module 10 for further exemplary demonstration. The light-emitting diode module 10 includes a bridge rectifying unit 102, a light-emitting diode unit 104, and an integrated circuit unit 106. In particular, the bridge rectifying unit 102, the light-emitting diode unit 104, and the integrated circuit unit 106 are integrated into a system in package (SIP). Instead of using a printed circuit board (PCB), the bridge rectifying unit 102, the light-emitting diode unit 104, and the integrated circuit unit 106 are packaged into a light-emitting diode module.

The bridge rectifying unit 102 rectifies the external AC voltage source Vac into an inner DC voltage source (not labeled). The light-emitting diode unit 104 is electrically connected to the bridge rectifying unit 102 and is driven through the DC voltage source. The light-emitting diode unit 104 includes a plurality of light-emitting diode strings 104_N and the light-emitting diode strings 104_N are electrically connected in series. The integrated circuit unit 106, which is supplied through the DC voltage source, is electrically connected to the bridge rectifying unit 102 and the light-emitting diode unit 104. In this embodiment, the light-emitting diode module 10 provides a piecewise current control. For convenience, four-section (N=4) current control is taken for example, but not limited.

In addition, the integrated circuit unit 106 has at least one constant-current source 1066_N, at least one switch element 1064_N, and a controller 1062. As the above-mentioned four-section current control, the amount of the constant-current source 1066_N is four. Hence, the four constant-current sources 1066_N are a first constant-current source 1066_1, a second constant-current source 1066_2, a third constant-current source 1066_3, and a fourth constant-current source 1066_4, respectively. Furthermore, the four switch elements 1064_N are a first switch element 1064_1, a second switch element 1064_2, a third switch element 1064_3, and a fourth switch element 1064_4, respectively. The controller 1062 is electrically connected to the constant-current sources 1066_N and the switch elements 1064_N to provide a piecewise current control, including a piecewise variant-current control and a piecewise constant-current control, to the light-emitting diode unit 104 by controlling the switch elements 1064_N. The operation of the piecewise current control will hereinafter be described in detail. Especially to deserve to be mentioned, the light-emitting diode unit 104 has a plurality of light-emitting diode strings 104_N, namely, a first light-emitting diode string 104_1, a second light-emitting diode string 104_2, a third light-emitting diode string 104_3, and a fourth light-emitting diode string 104_4. In particular, the amount of the constant-current sources 1066_N is equal to that of the switch elements 1064_N and that of the light-emitting diode strings 104_N. As shown in FIG. 3, each constant-current source 1066_N is electrically connected to the corresponding switch element 1064_N in series to form a series path, and then the series paths are electrically connected to each other in parallel. Each of the switch elements can be a metal-oxide semiconductor field effect transistor (MOSFET) or a bipolar junction transistor (BJT).

Figure 4A:
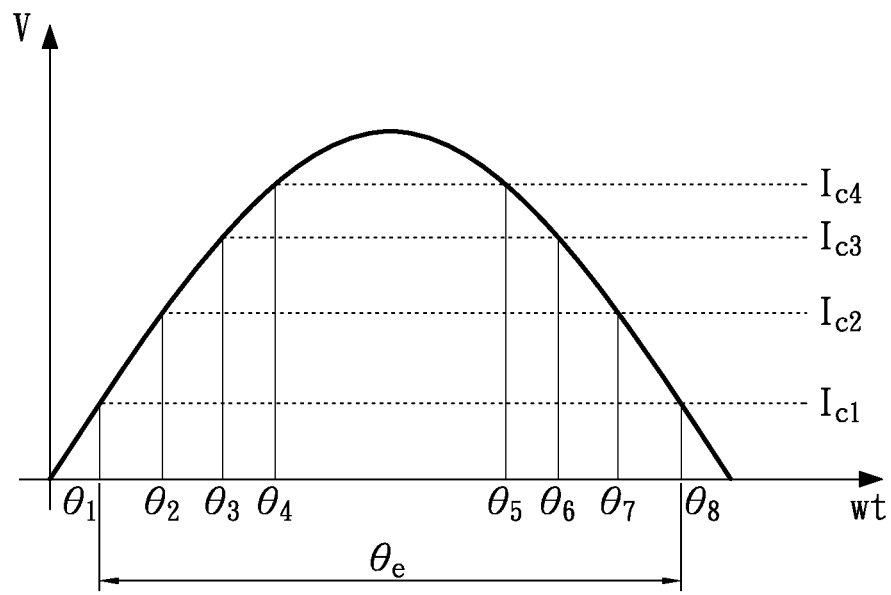
FIG. 4A is a schematic waveform of a piecewise variant-current control according to the prevent invention.

The operation of the piecewise current control will be described in detail as follows. Reference is made to FIG. 4A which is a schematic waveform of a piecewise variant-current control according to the prevent invention. As mentioned above, the light-emitting diode unit 104 has four light-emitting diode strings 104_N because the four-section current control is taken for example. For convenience, it is assumed that each light-emitting diode string 104_N has ten light-emitting diodes and a forward voltage of each light-emitting diode is 3 volts.

In addition, we assume that the external AC voltage source Vac is a 110-volt AC utility power. The external AC voltage source Vac is rectified by the full-wave bridge rectifying unit 102 and a waveform for the rectified voltage is shown in FIG. 4, but only a positive-half cycle of the rectified voltage is shown. Also, the rectified voltage is provided to drive the light-emitting diode unit 104. Note that, a magnitude of the rectified driven voltage is equal to a root-mean-square value of the external AC voltage source Vac. That is, the peak value of the rectified driven voltage is about 156 volts when the external AC voltage source Vac is a 110-volt AC utility. As mentioned above, each light-emitting diode string 104_N includes ten light-emitting diodes and each light-emitting diode has a 3-voltage forward voltage, but not limited. The magnitude of the forward voltage of the light-emitting diode is related to the type of the light-emitting diode. For example, the forward voltage of red LEDs is 2 volts, whereas that of blue or white LEDs is between 3 to 3.5 volts. Hence, a total forward voltage of each light-emitting diode string 104_N is 30 volts. That is, a first forward voltage Vf1 of the first light-emitting diode string 104_1 is 30 volts, a second forward voltage Vf2 of the second light-emitting diode string 104_2 is 30 volts, a third forward voltage Vf3 of the third light-emitting diode string 104_3 is 30 volts, and a fourth forward voltage Vf4 of the fourth light-emitting diode string 104_4 is 30 volts.

All the switch elements 1064_N are turned off by the controller 1062 so that the light-emitting diode unit 104 does not illuminate when the driven voltage detected by the controller 1062 is less than the first forward voltage Vf1.

Figure 5A:
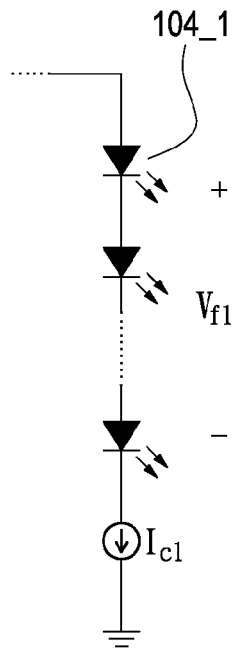
FIG. 5A is a partial circuit diagram of an equivalent circuit operated in a first condition in FIG. 3.

As the driven voltage gradually increases until the driven voltage is greater than the first forward voltage Vf1, the first switch element 1064_1 is turned on by the controller 1062 (the remainder switch elements are turned off). That is, the first switch element 1064_1 is turned on at a first turned-on angle θ1 when the driven voltage is greater than 30 volts. Under this condition, the first light-emitting diode string 104_1 illuminates and a first current Ic1 of the first constant-current source 1066_1 flows through the first light-emitting diode string 104_1. In this embodiment, the first turned-on angle θ1 is about 0.062π radians, namely, 11.12 degrees. An equivalent circuit of this embodiment is shown in FIG. 5A.

Figure 5B:
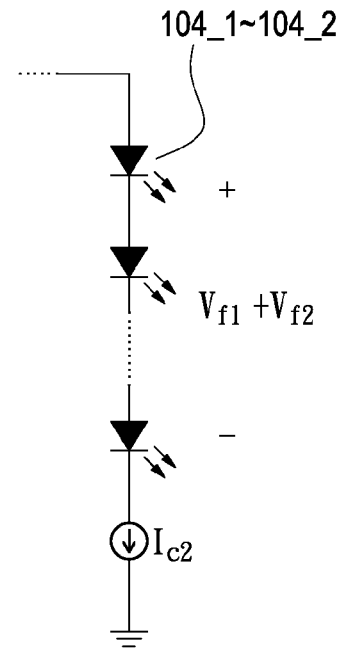
FIG. 5B is a partial circuit diagram of an equivalent circuit operated in a second condition in FIG. 3.

As the driven voltage gradually increases until the driven voltage is greater than the sum of the first forward voltage Vf1 and the second forward voltage Vf2, the second switch element 1064_2 is turned on by the controller 1062 (the remainder switch elements are turned off). That is, the second switch element 1064_2 is turned on at a second turned-on angle θ2 when the driven voltage is greater than 60 volts. Under this condition, the first light-emitting diode string 104_1 and the second light-emitting diode string 104_2 illuminate and a second current Ic2 of the second constant-current source 1066_2 flows through the first light-emitting diode string 104_1 and the second light-emitting diode string 104_2 (because the second light-emitting diode string 104_2 is electrically connected to the first light-emitting diode string 104_1 in series). In this embodiment, the second turned-on angle θ2 is about 0.126π radians, namely, 22.69 degrees. An equivalent circuit of this embodiment is shown in FIG. 5B.

Figure 5C:
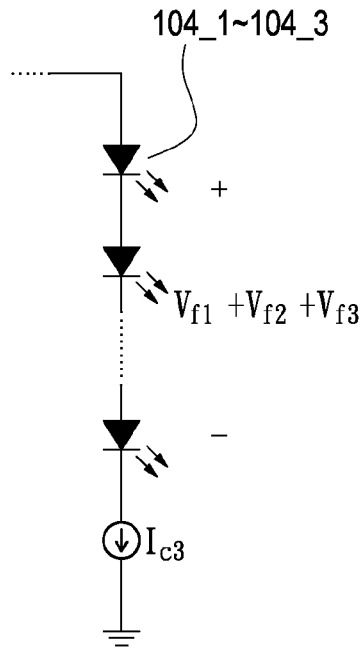
FIG. 5C is a partial circuit diagram of an equivalent circuit operated in a third condition in FIG. 3.

As the driven voltage gradually increases until the driven voltage is greater than the sum of the first forward voltage Vf1, the second forward voltage Vf2, and the third forward voltage Vf3, the third switch element 1064_3 is turned on by the controller 1062 (the remainder switch elements are turned off). That is, the third switch element 1064_3 is turned on at a third turned-on angle θ3 when the driven voltage is greater than 90 volts. Under this condition, the first light-emitting diode string 104_1, the second light-emitting diode string 104_2, and the third light-emitting diode string 104_3 illuminate and a third current Ic3 of the third constant-current source 1066_3 flows through the first light-emitting diode string 104_1, the second light-emitting diode string 104_2, and the third light-emitting diode string 104_3 (because the third light-emitting diode string 104_3 is electrically connected to the first light-emitting diode string 104_1 and the second light-emitting diode string 104_2 in series). In this embodiment, the third turned-on angle θ3 is about 0.1967π radians, namely, 35.35 degrees. An equivalent circuit of this embodiment is shown in FIG. 5C.

Figure 5D:
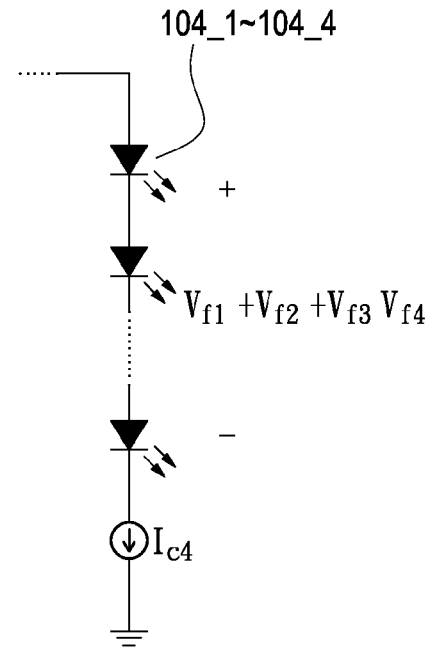
FIG. 5D is a partial circuit diagram of an equivalent circuit operated in a fourth condition in FIG. 3.

As the driven voltage gradually increases until the driven voltage is greater than the sum of the first forward voltage Vf1, the second forward voltage Vf2, the third forward voltage Vf3, and the fourth forward voltage Vf4, the fourth switch element 1064_4 is turned on by the controller 1062 (the remainder switch elements are turned off). That is, the fourth switch element 1064_4 is turned on at a fourth turned-on angle θ4 when the driven voltage is greater than 120 volts. Under this condition, the first light-emitting diode string 104_1, the second light-emitting diode string 104_2, the third light-emitting diode string 104_3, and the fourth light-emitting diode string 104_4 illuminate and a fourth current Ic4 of the fourth constant-current source 1066_4 flows through the first light-emitting diode string 104_1, the second light-emitting diode string 104_2, the third light-emitting diode string 104_3, and the fourth light-emitting diode string 104_4 (because the fourth light-emitting diode string 104_4 is electrically connected to the first light-emitting diode string 104_1, the second light-emitting diode string 104_2, and the third light-emitting diode string 104_3 in series). In this embodiment, the fourth turned-on angle θ4 is about 0.2817π radians, namely, 50.48 degrees. An equivalent circuit of this embodiment is shown in FIG. 5D.

In this embodiment, the four-section current control is taken for example. After the four light-emitting diode strings 104_N are lightened, the driven voltage is still increased. At this time, the light-emitting diode strings 104_N are driven by the fourth current Ic4 of the fourth constant-current source 1066_4.

As the driven voltage gradually decreases after reaching the peak of the external AC voltage source Vac until the driven voltage is less than the sum of the first forward voltage Vf1, the second forward voltage Vf2, the third forward voltage Vf3, and the fourth forward voltage Vf4, the third switch element 1064_3 is turned on by the controller 1062 (the remainder switch elements are turned off). That is, the third switch element 1064_3 is turned on at a fifth turned-on angle θ5 when the driven voltage is less than 120 volts. Under this condition, the first light-emitting diode string 104_1, the second light-emitting diode string 104_2, and the third light-emitting diode string 104_3 illuminate and the third current Ic3 of the third constant-current source 1066_3 flows through the first light-emitting diode string 104_1, the second light-emitting diode string 104_2, and the third light-emitting diode string 104_3 (because the third light-emitting diode string 104_3 is electrically connected to the first light-emitting diode string 104_1 and the second light-emitting diode string 104_2 in series). In this embodiment, the fifth turned-on angle θ5 is about 0.719π radians, namely, 129.52 degrees. An equivalent circuit of this embodiment is shown in FIG. 5C.

As the driven voltage gradually decreases until the driven voltage is less than the sum of the first forward voltage Vf1, the second forward voltage Vf2, and the third forward voltage Vf3, the second switch element 1064_2 is turned on by the controller 1062 (the remainder switch elements are turned off). That is, the second switch element 1064_2 is turned on at a sixth turned-on angle θ6 when the driven voltage is less than 90 volts. Under this condition, the first light-emitting diode string 104_1 and the second light-emitting diode string 104_2 illuminate and the second current Ic2 of the second constant-current source 1066_2 flows through the first light-emitting diode string 104_1 and the second light-emitting diode string 104_2 (because the second light-emitting diode string 104_2 is electrically connected to the first light-emitting diode string 104_1 in series). In this embodiment, the sixth turned-on angle θ6 is about 0.804π radians, namely, 144.65 degrees. An equivalent circuit of this embodiment is shown in FIG. 5B.

As the driven voltage gradually decreases until the driven voltage is less than the sum of the first forward voltage Vf1 and the second forward voltage Vf2, the first switch element 1064_1 is turned on by the controller 1062 (the remainder switch elements are turned off). That is, the first switch element 1064_1 is turned on at a seventh turned-on angle θ7 when the driven voltage is less than 60 volts. Under this condition, the first light-emitting diode string 104_1 illuminates and the first current Ic1 of the first constant-current source 1066_1 flows through the first light-emitting diode string 104_1. In this embodiment, the seventh turned-on angle θ7 is about 0.874π radians, namely, 157.31 degrees. An equivalent circuit of this embodiment is shown in FIG. 5A.

As the driven voltage gradually decreases until the driven voltage is less than the first forward voltage Vf1 at an eighth turned-on angle θ8, all the switch element 1064_N are turned off by the controller 1062. That is, all the switch elements 1064_N are turned off by the controller 1062 so that the light-emitting diode unit 104 does not illuminate when the driven voltage is less than 30 volts. In this embodiment, the eighth turned-on angle θ8 is about 0.938π radians, namely, 168.88 degrees.

In this embodiment, the four-section current control is taken for example. After the four light-emitting diode strings 104_N are off, the driven voltage is still decreased. When the external AC voltage source Vac is provided from the positive-half cycle to a negative-half cycle, the magnitude of the external AC voltage source Vac becomes negative. Because of the full-wave rectification, however, the driven voltage is rectified into a positive voltage value. Accordingly, the waveform of the driven voltage as the external AC voltage source Vac operates at the negative-half cycle is identical to that as the external AC voltage source Vac operates at the positive-half cycle. The driven voltage gradually increases when the external AC voltage source Vac is from the initial of the negative-half cycle to the peak thereof. On the other hand, the driven voltage gradually decreases when the external AC voltage source Vac is from the peak to the next initial of the positive-half cycle. Because the piecewise current control of the controller 1062 in the positive-half cycle of the external AC voltage source Vac is identical to that in the negative-half cycle, the detail operation of controlling the light-emitting diode unit 104 is omitted here for conciseness.

Figure 4B:
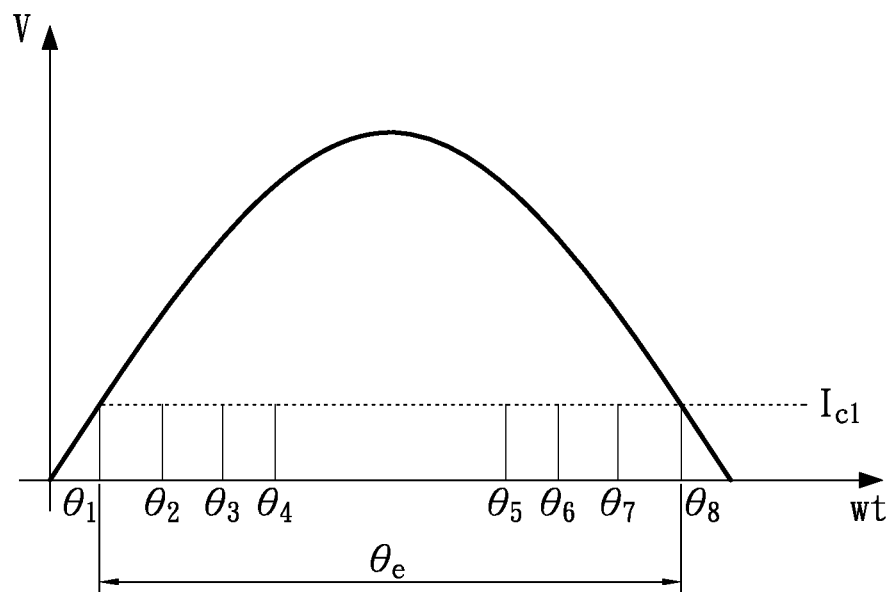
FIG. 4B is a schematic waveform of a piecewise constant-current control according to the prevent invention.

Especially to deserve to be mentioned, the magnitude of the constant-current sources 1066_N can be determined according to the volt-ampere characteristics of the light-emitting diodes. Note that, the controller 1062 provides a piecewise variant-current control to the light-emitting diode unit 104 when a magnitude of the at least one constant-current source 1066_N is varied with a variation of a magnitude of the voltage source. Hence, the current values Ic1~Ic4 of the constant-current sources 1066_N are different, as shown in FIG. 4A, the light-emitting diode module 10 are driven by the piecewise variant-current control. On the other hand, the controller 1062 provides a piecewise constant-current control to the light-emitting diode unit 104 when a magnitude of the at least one constant-current source 1066_N is fixed with a variation of a magnitude of the voltage source. Hence, the current values Ic1~Ic4 of the constant-current sources 1066_N are identical, as shown in FIG. 4B, the light-emitting diode module 10 are driven by the piecewise constant-current control.

Hence, a lighting time interval θe is a period that the light-emitting diode unit 104 is illuminated, which is shown between the first turned-on angle θ1 and the eighth turned-on angle θ8 in the positive-half cycle. Accordingly, the lighting time of the light-emitting diode unit 104 is significantly lengthened through the piecewise current control, including the piecewise variant-current control and the piecewise constant-current control.

In addition, the amount of the constant-current sources 1066_N can be adjusted according to the application demand, but not limited to four. Note that, the amount of the constant-current sources 1066_N with different current values can be added to produce a step-like current waveform to closely meet the sinusoidal voltage waveform of the AC driven voltage. Accordingly, the piecewise variant-current control is provided to significantly increase a power factor of the AC driven light-emitting diode module.

Figure 6:
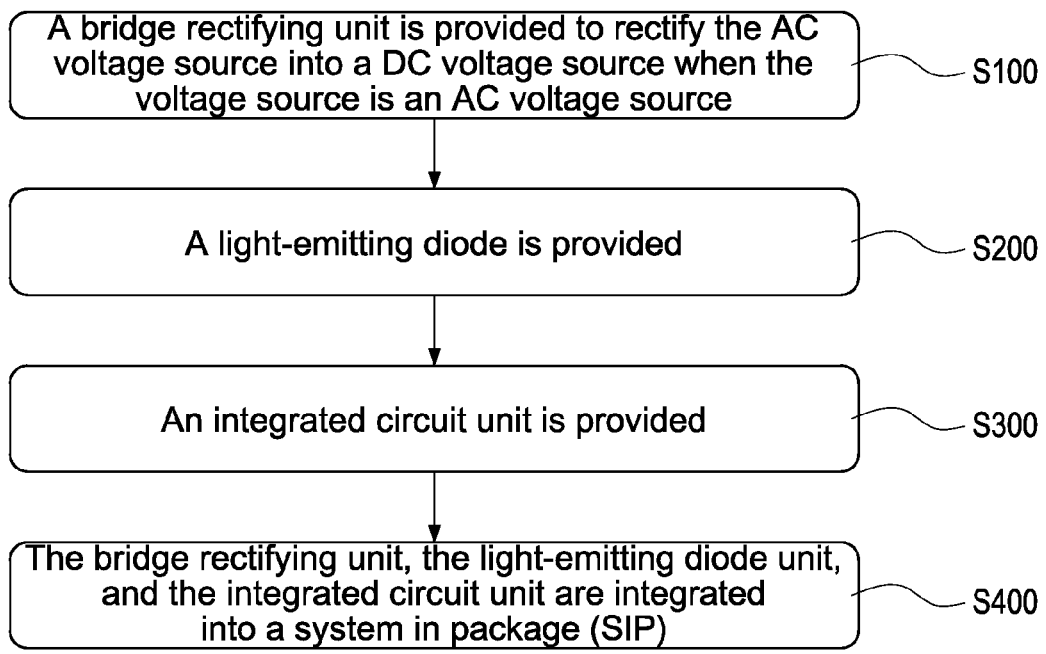
FIG. 6 is a flowchart of operating a light-emitting diode module according to the disclosure.

Reference is made to FIG. 6 which is a flowchart of operating a light-emitting diode module according to the disclosure. The light-emitting diode module is supplied through a voltage source. In particular, the voltage source is an AC voltage source or a DC voltage source. The method of operating the light-emitting diode module includes the following steps: First, a light-emitting diode is provided (S200). The light-emitting diode unit has a plurality of light-emitting diode strings which are electrically connected in series. Before the step (S200), a bridge rectifying unit is provided to rectify the AC voltage source into a DC voltage source when the voltage source is an AC voltage source (S100). Afterward, an integrated circuit unit is provided (S300). The integrated circuit unit has at least one constant-current source, at least one switch element, and a controller to provide a piecewise current control to the light-emitting diode unit by judging a magnitude of the voltage source. In particular, the amount of the at least one constant-current source is equal to that of the at least one switch element and that of the light-emitting diode strings. Also, each constant-current source is electrically connected to the corresponding switch element in series to form a series path, and then the series paths are electrically connected to each other in parallel. Note that, the at least one switch element is a metal-oxide semiconductor field effect transistor (MOSFET) or a bipolar junction transistor (BJT). In the step (S300), the light-emitting diode unit includes a plurality of light-emitting diode strings and each of the light-emitting diode strings has a total forward voltage added from individual forward voltage of the light-emitting diodes. The controller controls at least one switch element to on or off according to the magnitude of the rectified driven voltage and that of the total forward voltage, thus controlling turning on or off the light-emitting diode unit. Note that, the controller provides a piecewise constant-current control to the light-emitting diode unit when magnitude of the constant-current sources are fixed; on the other hand, the controller provides a piecewise variant-current control to the light-emitting diode unit when magnitude of the constant-current sources are varied. The bridge rectifying unit, the light-emitting diode unit, and the integrated circuit unit are integrated into a system in package (SIP) (S400). That is, instead of using a printed circuit board (PCB), the bridge rectifying unit, the light-emitting diode unit, and the integrated circuit unit are packaged into a light-emitting diode module.

In conclusion, the disclosure has following advantages:

1. A step-like current waveform (also called stair-like current waveform) is produced to closely meet the sinusoidal voltage waveform of the AC driven voltage through the piecewise variant-current control, thus significantly increasing the power factor of the AC driven light-emitting diode module;

2. The light-emitting diode unit is driven section by section based on the AC driven voltage through the piecewise variant-current or constant-current control, thus lengthening the lighting time of the light-emitting diode unit; and 3. A system in package (SIP) is formed by integrating the bridge rectifying unit, the light-emitting diode unit, and the integrated circuit unit, thus minifying the light-emitting diode module and simplifying the package process.

Although the disclosure has been described with reference to the preferred embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A light-emitting diode module, comprising:
  a light-emitting diode unit having a plurality of light-emitting diode strings electrically connected in series; and
  an integrated circuit unit coupled to the light-emitting diode unit, and comprising:
    a first constant-current source for providing a first current;
    a second constant-current source for providing a second current which is greater than the first current;
    a first switch element coupled to the first constant-current source;
    a second switch element coupled to the second constant-current source; and a controller configured to control the first and second switch elements in a way such that the first and second constant-current sources are set to alternately provide different currents in response to a first voltage and a second voltage which is greater than the first voltage.

2. The light-emitting diode module of claim 1, wherein the integrated circuit unit is coupled to a voltage source for providing an AC voltage or a DC voltage.

3. The light-emitting diode module of claim 2, wherein the first switch element is turned on and the second switch element is turned off, when the AC voltage or the DC voltage is larger than a forward voltage of the plurality of light-emitting diode strings.

4. The light-emitting diode module of claim 1, further comprising a bridge rectifying unit.

5. The light-emitting diode module of claim 1, wherein the controller is configured to provide a piecewise variant-current control.

6. The light-emitting diode module of claim 1, wherein the first and second constant-current sources are coupled to each other in parallel.

7. The light-emitting diode module of claim 1, wherein the first and second constant-current sources are coupled to the first and second switch elements in series, respectively.

8. The light-emitting diode module of claim 1, wherein the first or second switch element comprises a metal-oxide semiconductor field effect transistor (MOSFET) or a bipolar junction transistor (BJT).

9. The light-emitting diode module of claim 1, wherein the first current or second current has a step-like form substantially fitting the first voltage or second voltage, respectively.

* * * * *